United States Patent [15] 3,639,978

Schurman [45] Feb. 8, 1972

[54] METHOD FOR MAKING FLEXIBLE ELECTRICAL CONNECTIONS

[72] Inventor: Walter R. Schurman, Centerville, Ohio

[73] Assignee: The United States of America as represented by the United States Atomic Energy Commission

[22] Filed: Nov. 3, 1969

[21] Appl. No.: 873,222

[52] U.S. Cl. ..........................29/628, 339/254 R, 339/255 B, 339/255 RT

[51] Int. Cl. ..........................H01r 43/00, H05k 43/00

[58] Field of Search ..................339/17, 254, 255 B, 255 RT; 174/68.5; 29/628, 626

[56] References Cited

UNITED STATES PATENTS 3,484,935 12/1969 Burns ......................29/628
3,066,274 11/1962 Ellis ......................339/97
3,452,149 6/1969 Rinaldi ....................174/68.5
3,354,260 11/1967 Brandt et al. ..............174/68.5

*Primary Examiner*—John F. Campbell
*Assistant Examiner*—Richard Bernard Lazarus
*Attorney*—Roland A. Anderson

[57] ABSTRACT

An apparatus and method for making electrical connection to an electrically conductive lead of a printed circuit board including a connector assembly of an elastomeric cylinder having a plurality of conductors woven thereabout with about 72 picks per inch and with each conductor oriented at an angle of at least about 30° from the axis of the cylinder, connection to the printed circuit board lead being effected by first stretching the elastomeric cylinder and associated mesh, inserting the stretched cylinder into a hole in the printed circuit board and lead, and releasing the cylinder to allow it to expand into and about the hole to press the plurality of conductors into electrical contact with the lead.

4 Claims, 4 Drawing Figures

INVENTOR.
WALTER R. SCHURMAN
BY Roland A. Anderson
Attorney

METHOD FOR MAKING FLEXIBLE ELECTRICAL CONNECTIONS

BACKGROUND OF INVENTION

Making electrical connections to the electrically conductive portions of printed circuit boards has been a problem for which solutions have been proposed. Of especial concern, however, is the problem of making a flexible connection from the printed circuit board, or the like for use, for example, in environments in which vibrations and stresses may be encountered.

Several proposals have been made to solve this problem, but, in general, the solutions proffered heretofore require an undue amount of effort to accomplish the connection. Additionally, virtually none of the solutions has presented a simple and reliable method of flexibly interconnecting an external wire to a printed circuit board.

One method which has been proposed uses a braided conductor formed about a deformable member. The braid is cut, unraveled and bent to extend outwardly from the deformable member at the location at which a connection is desired. The deformable member is then inserted into a hole cut in the printed circuit board through the conductor or lead with which electrical connection is desired, and the outwardly extending braid is rigidly soldered to the printed circuit lead. The disadvantages of this method are readily apparent. First, each conductor of the braid must be precisely cut and shaped to be physically mateable with the printed circuit lead in order to create a reliable physical connection, and, subsequently a number of intricate solder connections must be made between each conductor of the braid and the printed circuit board lead. Additionally, because the braid is firmly soldered, it may have a tendency to pull, break or work loose when the board and connection are subjected to particular stresses or vibrations.

SUMMARY OF INVENTION

In light of the prior art, it is, therefore, an object of the invention to present a method and apparatus for making a flexible connection to a printed circuit board reliably, simply, and without requiring the cutting, forming, or soldering of conductors.

It is a further object of the invention to make a flexible connection which may be used to make electrical connection between a lead of a printed circuit board and wire external to the board, or a lead of a second printed board, or a lead on the opposite side of the same printed circuit board.

These and other objects, features, and advantages will be particularly pointed out and will become apparent from the following description when read in conjunction with the attached drawing and appended claims.

In accordance with the invention, a method and apparatus are presented for forming a flexible electrical connection to an electrically conductive portion of a substrate in which a stretched elastomeric member having a plurality of conductors braided about it and formed at an angle of at least 30° from the axis the member is stretched and inserted into a hole through the electrically conductive portion of the substrate. The member is then released and allowed to return to its original shape, thereby expanding into and about the hole to sandwich the plurality of conductors between the substrate and an overlying portion of the elastomeric member to force the conductors into contact with the electrically conductive portion. If a connection is desired to a wire or other such conductor, the wire may be inserted through a hole in the member above the point of contact to the electrically conductive portion of the substrate. When the member is released, the conductors of the braid contract to firmly clamp and make electrical contact to the inserted wire.

BRIEF DESCRIPTION OF THE DRAWING

The invention is illustrated in the accompanying drawing wherein.

The size and shapes in the figures have been exaggerated for purpose of illustration. Like reference numerals in the respective figures denote like parts.

DESCRIPTION OF THE PREFERRED EMBODIMENT

Figures 1, 2, 3, 4:
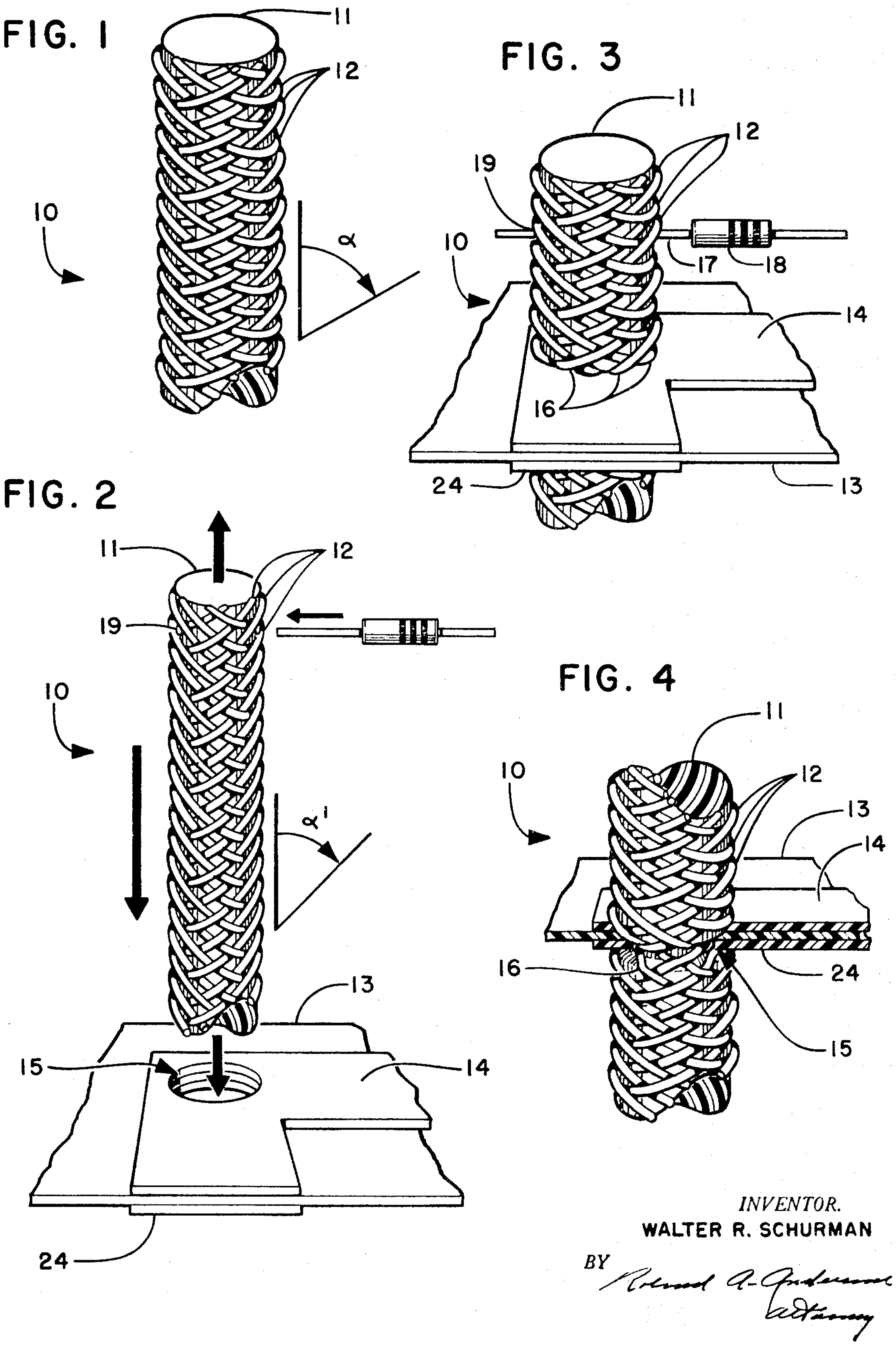
FIG. 1 is a perspective view of a connector assembly used in the practice of the method of the invention.
FIGS. 2 and 3 are perspective views of the connector assembly of FIG. 1 and a printed circuit board having leads formed on each side between and to which electrical contact is to be made, illustrating, in sequence, the steps of the method of the invention.
FIG. 4 is a cross-sectional view of the printed circuit board of FIGS. 2 and 3 illustrating the connection made in accordance with the method of the invention.

In accordance with the method of the invention, a flexible connector assembly, as the connector assembly 10 illustrated in FIG. 1, is used. The connector assembly 10 is constructed upon an elastomeric member 11, which may be of any elastically deformable material such as rubber, silicone rubber, polyurethane foam, and the like, and may be of any convenient shape, such as the generally cylindrical shape illustrated. A plurality of conductors 12, of any electrically conductive material, such as silver, copper, gold, aluminum, zinc, platinum or titanium, or some other metal, or of any metal combinations such as spring steel, phosphor bronze or beryllium copper or the like are wound or braided about member 11, as illustrated, each conductor forming an angle, $\alpha$, of at least 30°, and preferably between about 30° and 90°, from the axis of the elastomeric member 11. This particular range of angles permits unrestricted elongation of the entire structure allowing it to be stretched in the direction of the axis, and it has been found that an angle of 45° is particularly suitable to this end. Additionally, with the conductors configured in the braided arrangement shown, with a wire size of about 0.005 inches diameter, the conductor 12 may be arranged with about 70–90 picks, or crossings, per inch to additionally contribute to the overall length the structure may be stretched with contraction of the mesh and cone diameter concomitant with the elongation of the member 11.

The steps of the method of the invention for making a flexible connection to an electrically conductive portion or lead of a printed circuit board using the conductor assembly 10 of FIG. 1 are illustrated sequentially in FIGS. 2 and 3. The printed circuit board may be of a type well known in the art, illustrated in the figures by a substrate 13 having conductive leads 14 and 24 formed on each side thereof. A hole 15 is cut through board 13 and leads 14 and 24 of diameter of about 20 percent or more smaller than the diameter of connector assembly 10.

To form an electrical connection to leads 14 and 24, a tension is applied to connector assembly 10 in the direction of its cylindrical axis, illustrated by the arrows in FIG. 2, to elastically stretch and deform the connector 10 and thereby reduce its diameter to a size equal to or slightly less than the diameter of hole 15. While the tension is maintained to keep the connector 10 in its deformed shape the connector assembly 10 is inserted into hole 15 and the tension released, thereby allowing the connector assembly 10 to spring back to its original shape and diameter except within hole 15. Thus, as illustrated in FIGS. 3 and 4, the conductors 12 are formed and bent in and about the hole 15 to be forced by the elastomeric member 11 through and overlying the substrate into physical and electrical contact with the leads 14 and 24 at various points 16. It can be seen in FIG. 4 that the conductors 12 are sandwiched between the lead 14 on board 13 and overlying portion of elastomeric member 11 and are firmly gripped in physical and electrical contact with lead 14. A similar gripping sandwich is seen between lead 24 and the portion of elastomeric member 11 overlying it on the underside of board 13.

If a connection is to be made to a conductor or wire external to the printed circuit board, such as wire 17 of resistor 18, illustrated in FIGS. 2 and 3, the wire 17 may be inserted in a hole 19 in the elastomeric member 11 when in the stretched condition (FIG. 2). When the connector assembly 10 is released (FIG. 3) the conductors 12 return to their original angle and position to clamp and make physical and electrical connection to the wire 17. Of course, a plurality of such wires may be simultaneously carried by conductor assembly 10 at any desired height from the printed circuit board.

Also, although the connector assembly has been illustrated as the type commonly referred to as an interconnection type, a connection from one printed circuit board to another or from a printed circuit board to an external lead, wire, or component, and, at the same time as a through connection, a connection between conductive strips on both sides of the same printed circuit board, it is not intended that the invention be limited to this construction. It is clear, for example, that the method of the invention may be used equally well in forming a connection between a single printed circuit board lead and an external component.

Although the invention has been described with a certain degree of particularity, it is understood that the present disclosure has been made by way of example and that numerous changes in the details of construction and arrangement of parts may be resorted to without departing from the spirit and scope of the invention.

I claim:

1. A method for making a flexible electrical connection to a conductive portion of a printed circuit board having a hole therethrough comprising: longitudinally stretching along the longitudinal axis thereof and solely by said stretching simultaneously transversely reducing an elongate elastomeric member and a plurality of electrical conductors woven thereabout from their normally combined transverse cross section greater than said printed circuit board hole size to a combined cross section less than said hole size for unimpeded and free movement through said hole, said member being devoid of electrical conductors within its periphery and said conductors having a density of between about 72 to 90 picks per inch to insure subsequent electrical contact with said conductive portion of said printed circuit board and each forming an angle of between about 30° to 90° from the longitudinal axis along which said member is stretched for unrestricted reducing and stretching thereof; inserting said longitudinally stretched and transversely reduced member and conductors into and through said hole while so stretched and reduced and otherwise unrestrained; thereafter releasing said stretching of said member and conductors returning them to their original shape and expanding them into contact with walls of said hole and causing the member outside of said hole to expand laterally beyond said hole and bend said conductors outwardly and downwardly into engagement with said conductive portion and sandwich them between said conductive portion and an overlying portion of said elastomeric member forcing and maintaining said conductors into electrical contact with said conductive portion of said printed circuit board.

2. The method of claim 1 further comprising inserting said member having conductors woven thereabout into a hole in a second electrically conductive portion of said substrate.

3. The method of claim 2 wherein said second portion of said substrate is a second lead formed onto an opposite side of said printed circuit board.

4. The method of claim 1 additionally comprising the step of inserting at least one electrical conductor into a hole in said member and between adjoining of said conductors while said member and conductors are so stretched thereby allowing said conductors woven about said member to clamp and make electrical contact to said at least one conductor when said member and conductors are released to return to their original shape.

* * * * *